United States Patent
Gaertner (10) Patent No.: US 8,060,480 B2
(45) Date of Patent: Nov. 15, 2011

(54) PROCESSING SUBSTANTIAL AMOUNTS OF DATA USING A DATABASE

(75) Inventor: Christian Gaertner, Oestringen (DE)

(73) Assignee: SAP AG, Walldorf (DE)

( * ) Notice: Subject to any disclaimer, the term of this patent is extended or adjusted under 35 U.S.C. 154(b) by 344 days.

(21) Appl. No.: 12/509,903

(22) Filed: Jul. 27, 2009

(65) Prior Publication Data

US 2011/0022576 A1   Jan. 27, 2011

(51) Int. Cl.
*G06F 17/30* (2006.01)
(52) U.S. Cl. ......... 707/687; 707/694; 707/696; 707/704
(58) Field of Classification Search ........... 707/687–704
See application file for complete search history.

(56) References Cited

U.S. PATENT DOCUMENTS

| | | | |
|---|---|---|---|
| 2007/0171921 A1* | 7/2007 | Wookey et al. ............... | 370/401 |
| 2007/0180448 A1* | 8/2007 | Low et al. ..................... | 718/1 |
| 2007/0180449 A1* | 8/2007 | Croft et al. .................... | 718/1 |
| 2007/0180450 A1* | 8/2007 | Croft et al. .................... | 718/1 |
| 2007/0180493 A1* | 8/2007 | Croft et al. .................... | 726/2 |
| 2007/0186212 A1* | 8/2007 | Mazzaferri et al. ........... | 718/1 |
| 2007/0192329 A1* | 8/2007 | Croft et al. .................... | 707/10 |

OTHER PUBLICATIONS

'Data Retention Tool (DART) (CA-GTF-DRT), Release 4.6C' [online]. SAP, 2001, [retrieved on Jul. 13, 2009]. Retrieved from the Internet: <URL: http://help.sap.com/printdocu/core/Print46c/en/data/pdf/ CAGTFDART/CAGTFDART.pdf>, 120 pages.

* cited by examiner

*Primary Examiner* — Hanh Thai
(74) *Attorney, Agent, or Firm* — Fish & Richardson P.C.

(57) ABSTRACT

Among other disclosed subject matter, a computer-implemented method for handling large amounts of data is to be initiated. The method includes receiving, using an application program executed from local memory of a computer system, portions of information from a first file. The method includes generating a database table in a peripheral storage device. The method includes storing the portions of information in the database table of the peripheral storage device. The method includes locking the database table, wherein the locking exclusively provides the application program a database accessing technique to the database table. The method includes processing by the application program the portions of information in the database table using the database accessing technique. The method includes clearing the database table upon a termination of the application program. The method includes, unlocking the database table upon the termination of the application program.

15 Claims, 4 Drawing Sheets

PROCESSING SUBSTANTIAL AMOUNTS OF DATA USING A DATABASE

TECHNICAL FIELD

This document relates to processing large amounts of data.

BACKGROUND

Organizations can use enterprise resource planning (ERP) systems to manage financial data. The ERP system can periodically save the financial data to a file to record the financial status of the organization for a particular period. The file can periodically be retrieved and processed by an application program executed from application server memory, for example, to change a formatting of the file or provide some information from the file to a different organization. The processing by the application program can include storing information from the file in the application server memory and manipulating portions of the information while the information is stored in application server memory.

SUMMARY

The invention relates to processing substantial amounts of data using a database.

In a first aspect, a computer-implemented method for handling large amounts of data is to be initiated. The method includes receiving, using an application program executed from local memory of a computer system, portions of information from a first file. The method includes generating a database table in a peripheral storage device. The method includes storing the portions of information in the database table of the peripheral storage device in lieu of storing the information in the local memory of the computer system, wherein the database table and local memory are both accessible to the application program. The method includes locking the database table, wherein the locking exclusively provides the application program a database accessing technique to the database table. The method includes processing by the application program the portions of information in the database table using the database accessing technique. The method includes clearing the database table upon a termination of the application program. The method includes, unlocking the database table upon the termination of the application program.

Implementations can include any or all of the following features. The processing can include generating a second file that includes portions of the processed information. The received portions of the first file can exceed an addressable memory space of the local memory. The method can further include determining that the portions of information from the first file exceed an addressable memory space of the local memory and, in response, receiving the portions of information, generating the database table, and storing the portions of information. The database accessing technique exclusively provided to the application program can include write access to the database table. The method can further include deleting the database table upon termination of the application program. The local memory can be volatile memory that loses a capability to store information upon a power disruption and the peripheral storage device can be non-volatile memory that stores information magnetically and maintains a capability to store information upon a power disruption.

In a second aspect, a computer program product is tangibly embodied in a computer-readable storage medium and includes instructions that when executed by a processor perform a method for handling large amounts of data. The method includes receiving, using an application program executed from local memory of a computer system, portions of information from a first file. The method includes generating a database table in a peripheral storage device. The method includes storing the portions of information in the database table of the peripheral storage device in lieu of storing the information in the local memory of the computer system, wherein the database table and local memory are both accessible to the application program. The method includes locking the database table, wherein the locking exclusively provides the application program a database accessing technique to the database table. The method includes processing by the application program the portions of information in the database table using the database accessing technique. The method includes clearing the database table upon a termination of the application program. The method includes, unlocking the database table upon the termination of the application program.

Implementations can include any or all of the following features. The processing can include generating a second file that includes portions of the processed information. The received portions of the first file can exceed an addressable memory space of the local memory. The method can further include determining that the portions of information from the first file exceed an addressable memory space of the local memory and, in response, receiving the portions of information, generating the database table, and storing the portions of information. The database accessing technique exclusively provided to the application program can include write access to the database table. The method can further include deleting the database table upon termination of the application program. The local memory can be volatile memory that loses a capability to store information upon a power disruption and the peripheral storage device can be non-volatile memory that stores information magnetically and maintains a capability to store information upon a power disruption.

In a third aspect, a system for handling large amounts of data includes a processor. The system includes local memory coupled to the processor through a memory bus. The system includes a peripheral storage device. The system includes computer-readable storage medium including instructions that when executed by the processor perform a method for handling large amounts of data. The method includes receiving, using an application program executed from the local memory of a computer system, portions of information from a first file. The method includes generating a database table in the peripheral storage device. The method includes storing the portions of information in the database table of the peripheral storage device in lieu of storing the information in the local memory of the computer system, wherein the database table and local memory are both accessible to an application program. The method includes locking the database table, wherein the locking exclusively provides the application program a database accessing technique to the database table. The method includes processing by the application program the portions of information in the database using the database accessing technique. The method includes clearing the database table upon a termination of the application program. The method includes unlocking the database table upon the termination of the application program.

The described subject matter may provide for one or more benefits, such as processing the contents of a large file more quickly with a database storing portions of the file in peripheral memory than if the portions of the file were stored in application server memory. Loading the file contents into a database enables the use of database accessing techniques as opposed to memory accessing techniques. Peripheral memory is less expensive than application server memory and can store the entire contents of a file that is larger than the application server memory or an addressable address space of an operating system.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
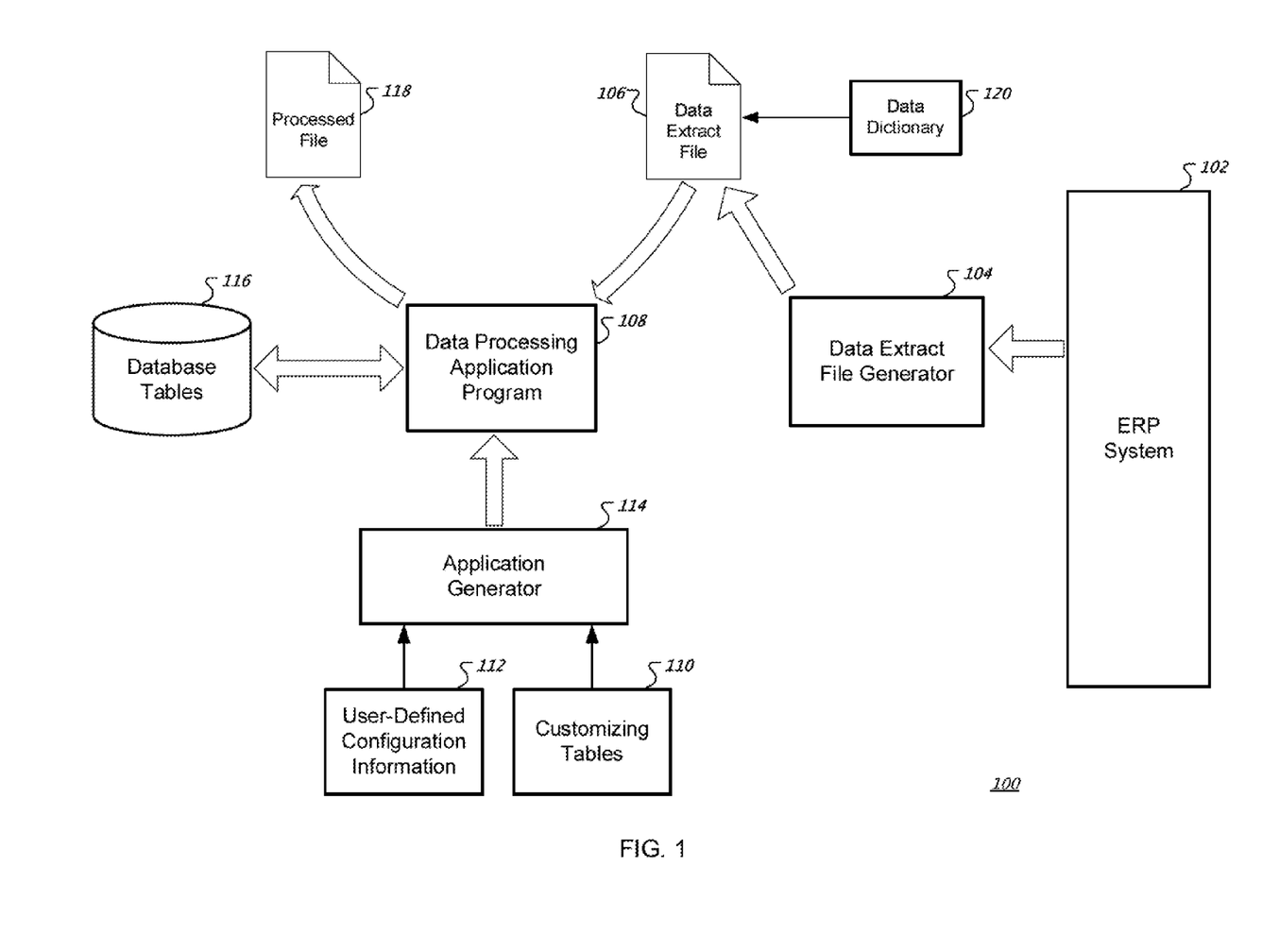
FIG. 1 is a block diagram schematically representing a system for processing large amounts of data.

FIG. 1 is a block diagram schematically representing a system 100 for processing large amounts of data. Organizations use enterprise resource planning (ERP) systems 102 to manage and coordinate all the resources, information, and functions of the organizations' business. Part of this management includes the processing and storage of significant amounts of financial data. On occasion, a "snapshot" of an organization's current financial status can be taken and recorded before the data in an ERP system 102 changes. For example, a data extract file generator 104 can traverse data structures maintained by the ERP system, pull financial data that is relevant to a current time period, and generate a data extract file 106 to record the financial status of the organization at a specific time. The ability to take this snapshot aids organizations in meeting legal data retention and reporting requirements. For example, the data extract file 106 can be created at the end of every financial quarter. This data extract file 106 can range be rather large, on the order of several gigabytes or even terabytes in size.

The data extract file 106 can contain data from several different applications in the ERP system 102. In some implementations, the information in the data extract file 106 is organized into segments that each store a particular type of information from documents stored by the ERP system. For example, one segment may include "Purchase order document header data" and another segment may include "Purchase order line item data," and one segment may include "Purchase order customer data." Thus, information from a single financial accounting document stored by the ERP system 102 (e.g., an SAP FI document) can be split into several segments, each segment including information for a portion of the document. A segment can include the same type of information from several different documents.

An organization may need to occasionally access the financial information stored in the data extract file 106. A common example is when the organization is being audited. If the auditor is an external agency, the organization may only want to disclose the portions of the financial data that are relevant to the investigation. Further, the external agency may use software systems that can not manipulate the format of the data extract file 106. Even if the audit is performed internally, the data extract file 106 can be large and unwieldy. A processed file 118 that includes a subset or processed version of the information in the data extract file 106 can be generated from the data extract file 106 by a data processing application 108.

The data processing application 108 can be created with an application generator 114 specifically for processing the data extract file 106 and generating the processed file 118. In this illustration, the data processing application is an executable file that operates autonomously to parse information from the data extract file 106 and generate the processed file 118 (a process discussed later in this document).

The application generator 114 can access a data dictionary 120 that is associated with the data extract file 106 (e.g., the data dictionary can be included in the data extract file 106). Every segment in the data extract file 106 can be based on a structure recorded in the data dictionary 114. Segments in the data extract file 106 and segment definitions in the data dictionary 114 can have the same name. The data dictionary 114 can list each segment in the data extract file, fields of each segment, and provide indexes to the fields. In some examples the data dictionary identifies field descriptions, field lengths, and line or field delimiters if the fields are not a pre-determined length. That is, the data dictionary can identify metadata for the information stored in the data extract file 106.

Application generator 114 can include a graphical user interface (GUI) that can receive user-defined configuration information 112. The user-defined configuration information indicates a configuration of the data processing application that the application generator 114 is to generate. The data processing application generates processed file 118 in accordance to its own configuration. The user-defined configuration information 112 can identify a specific data extract file 106 from a collection of files. In some examples, the application generator 114 accesses the data dictionary 120 and presents with the GUI a list of the segments and fields in the data extract file 106. A user of the application generator 114 can select a subset of the segments and fields to include in the processed file 118, as well as an ordering of the segments and fields. The data processing application generated in accordance with these user selections will generate a processed file that includes the selected segments and fields.

In some implementations, the user-defined configuration information 112 includes selection criteria for fields. The selection criteria defines conditional operations to perform on data in a field of the data extract file. If a condition is not met, the data processing operation will not include the field (or a segment) in the processed file 118. As an illustration, a field may only be copied from data extract file 106 to processed file 118 if a value contained in the field is between $1000 and $10,000. In some examples, the selection criteria can filter information from a specific year, period, company code, or depreciation area from a set of financial accounting documents. A user may request that processed file 118 only include information from financial accounting documents and not from controlling documents (e.g., SAP CO documents), source documents from material management (e.g., SAP MM documents), sales and distribution documents (e.g., SAP SD components), or asset accounting documents (e.g., SAP FI-AA documents).

In some implementations, a user of the application generator 114 selects one or more customizing tables 110. The customizing tables provide a template for the generation of data processing application 108. The templates can define default values that may be changed with user-defined configuration information 112. For example, a template entitled "Separate data extract file into financial accounting documents" can define a configuration for parsing the portions of financial accounting documents from several segments and re-combining the portions into whole financial documents. The re-combined documents can be saved as one or more processed files 118. In some examples, a user can save a user-defined configuration as a customizing table 110.

The user-defined configuration information 112 can identify operations for the data processing application 108 to perform upon the data from extract file 106. For example, the user can request that the data processing application 108 perform a Join operation on two or more data records from different segments to combine the data records. A user may want to specify that data for each financial accounting document should be grouped together in the processed file 118 instead of separated into segments (as noted above, each financial accounting document is parsed into segments that include a particular type of information common to several documents). In this example, the user would request that the data processing application 108 Join data from the "header data" segment and data from the "line item" segment. Additional operations that the data processing application 108 can perform upon the information parsed from the data extract file 106 are discussed later in this document.

In some implementations, a user can request that the data processing application 108 combine data from two or more separate data extracts 106. This feature can permit the merging of data from four data extract files 106, that each represent a fiscal quarter, into a processed file 118 that represents financial data for the entire fiscal year. In some examples, the data processing application generates several processed files 118. For example, each of several processed files can be a financial accounting document or include financial information for a fiscal quarter (when the data extract file 106 included financial information for an entire fiscal year).

Using the received user input, the customizing tables 110, and the data dictionary 120, application generator 114 generates the data processing application 108. The data processing application 108 can be executed and process information from the data extract file 106 to generate the processed file 118. This process is detailed with reference to process 200.

Figure 2:
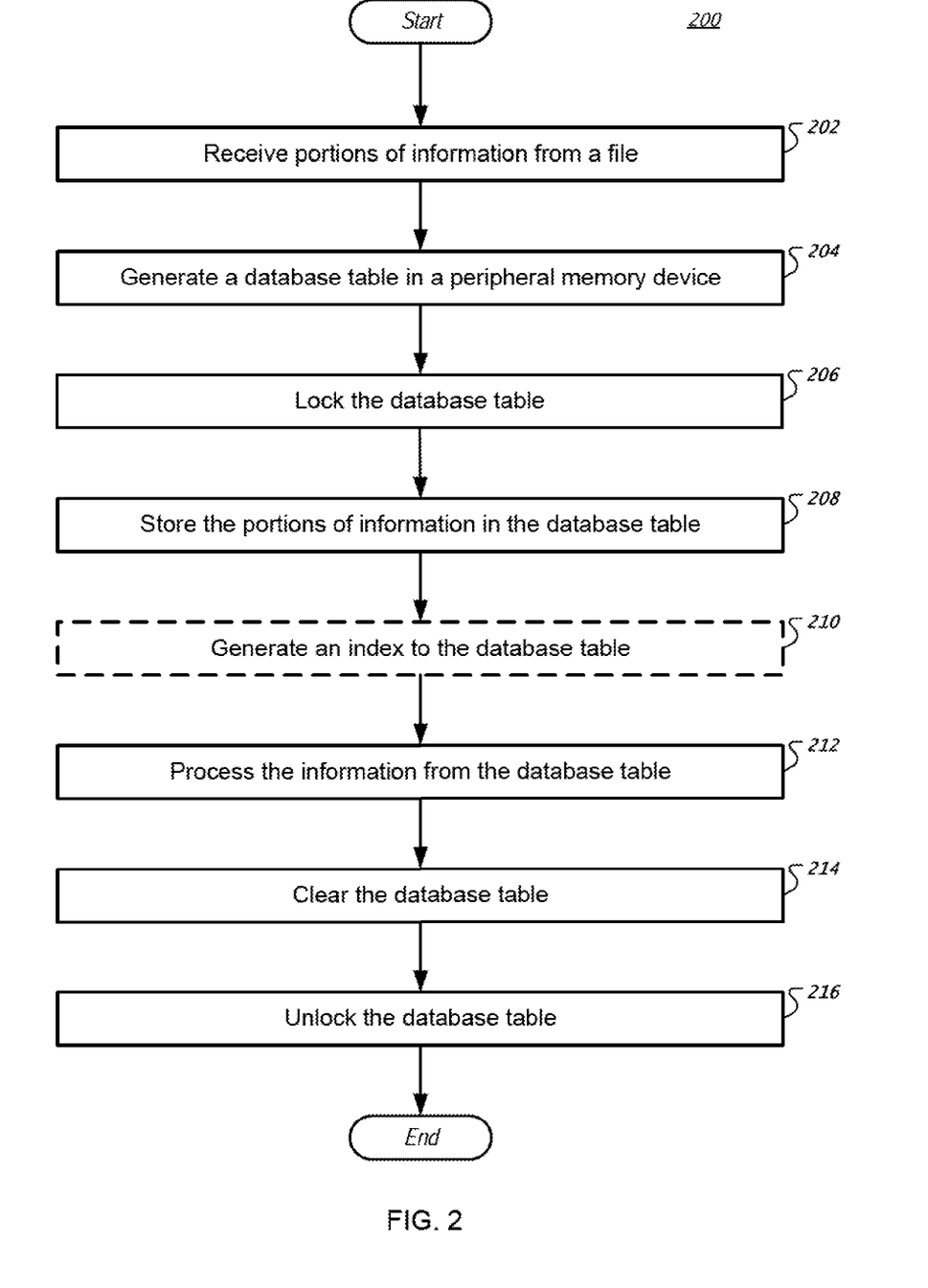
FIG. 2 is a flow chart of an example process for processing large amounts of data.

FIG. 2 is a flow chart of an example process 200 for processing large amounts of data. Process 200 will be described with reference to FIG. 3, a block diagram schematically representing a system 300 for processing large amounts of data, as an example. In step 202, the data processing application 108 receives portions of information from a data extract file 106 that is stored in a peripheral memory storage device 322. For example, when the data processing application 108 is executed, it performs a process that sequentially reads the portions of information from the peripheral memory storage 322 into primary storage 302 (e.g., a cache of the CPU 306 or the application server memory 304). The application server memory 304 can include a buffer for temporarily storing portions of the data extract file 106 before the portions are stored in a database, as described later in this document.

Figure 3:
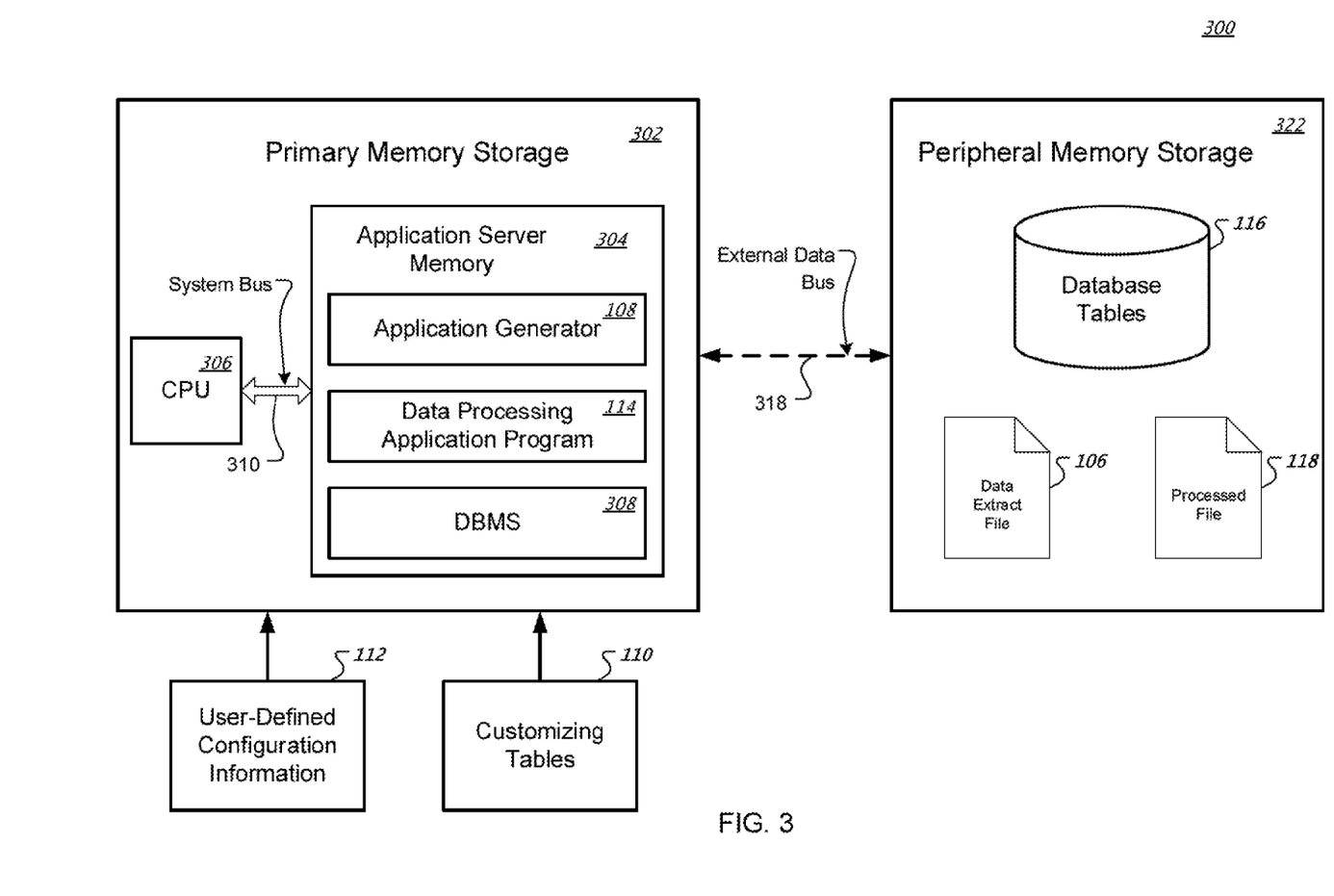
FIG. 3 is a block diagram schematically representing a system for processing large amounts of data.

In step 204, the data processing application 108 generates at least one database table 116 in the peripheral memory storage device 322 to store the received portions of information from data extract file 106. In some examples, the data processing application generates a database table 116 for each segment in the data extract file 106. Each table can include a column for each field in a segment. The data processing application may include information identifying the segments and fields in the data extract file 106 or can identify the segments and fields from the data dictionary 120 during runtime. In some implementations, the data processing application 108 requests that a database management system (DBMS) 308 create the database table (and subsequently organize, store, manage, and retrieve records in the database).

In step 206, the data processing application locks the database table 116. A lock provides a single application program exclusive access to the records in the database table 116. In some examples, the application program provided exclusive access is the only application program that can write to the locked database table 116. In various examples, the application program provided exclusive access is the only application program that can read from the locked database table 116. In some examples, the application program provided exclusive access is the only application program that can perform database accessing techniques (e.g., join, merge, sort, summarization). Other application programs may be unable to read or write to the locked database table. In examples where the locking and access to the database tables is controlled by the DBMS, the DBMS will not provide other application programs using the DBMS access to locked tables.

In step 208, the data processing application 114 stores a received portion of information into an appropriate database record. To store the information in an appropriate record, the data processing application 108 uses information from the data dictionary 120 to identify a semantic meaning of a portion of information received into primary memory storage 302 (e.g., a buffer in application server memory 304). For example, the application program 108 can identify the first 25 characters in the buffer as being associated with a "name" field for a "header data" segment that originated from a "Fiscal Year 2008" financial accounting document. The data processing application 114 can store the 25 character portion of information in the "name" column for a "header data" database table.

After storing of the portion of data in the database table 116, the portion of data can be removed from the primary memory storage 202 or replaced in the primary memory storage 202 with a new portion of data from the data extract file 106. The receipt of information, identification of a portion of the information, and copying of the portion of information to a database table can be repeated for an entire sequential sequence of data read from data extract file 106. The primary memory storage 302 available to the data processing application 114 for withdrawing portions of data from the file 106 and placing the portions in the database tables 116 can be much smaller than a size of the data extract file 106 and a size of the database tables 116.

In step 210, the data processing application 114 generates an index to the one or more database table. The database index is a data structure that improves the speed of operations (e.g., retrieval or processing) on records stored in the database table. A database index provides the data processing application efficient access to the ordered portions of information stored in the database tables 116. In some implementations, this step is optional. In other implementations, several indexes are generated for the one or more database tables.

In step 212, the data processing application 108 processes the information in the database. For example, a user of the application generator 114 may have requested that the processed file 118 only include information from three financial accounting documents (while the data extract file includes information from several types of hundreds of documents). Because information from a financial accounting document is separated into different tables (e.g., one table may include "Purchase Order document header data" and another table may include "Purchase order line item data"), the information corresponding to a single financial accounting document needs to be collected from the different tables. In this illustration, a "Join" operation can be performed to combine data records from two or more tables (each representing a segment) in the database (representing all the data from the data extract file). The Join operation can copy one record to another, place the Joined records in a new table, or copy the joined records to application server memory 304.

A Join request can conditionally operate, in some examples. For instance, the data processing application 108 may only Join two records if the records are from the same financial accounting document. The origin of the records can be verified by checking if the document number, company code, and posting period for a group of fields for the "header data" segment is the same as for the "line item data" segment. In some implementations, the Join statements compare records that contain similar data, even if the records do not share a common name. The data processing application 108 can perform other database operations upon data records in the locked tables of database 116. For example, the data processing application 108 can perform merge, sort, and summarization operations. A merge statement can insert new records or update existing records, depending on whether or not a condition is satisfied.

As an illustration, a user of the application generator can request that that data processing application program generate processed file that includes a list of FI documents ordered by document number and fiscal year for a certain range of customers. The data processing application program generates three database tables from the segments in the data extract file: one for FI document header data, one for FI document item data, and one for customer data. The user of the application generator has additionally requested that the data extract file include a subset of the information from the document items table (e.g., only amounts and customer numbers) and a subset of information from the customer table (e.g., only customer names and addresses). The data processing application performs a Join on the three database tables with the condition "header-doc.no.=item-doc.no." and "item-cust.no.=cust-cust.no." In addition, the data processing application performs a grouping right during the database selection and a summarization of the amounts for each customer number. These operations directly provide a result for output to the processed file.

If the data was stored within tables in application server memory instead of the database, similar operations would be time consuming and require additional memory. For example, processing three separate internal tables would require a nested loop about the three tables (i.e., a loop at the customer data within a loop at the item data within a loop at the header data) and a comparison of the fields. The data processing application program would additionally need to manually sort and summarize the data without being able to rely upon the corresponding database operations. Further, the use of nested loops requires additional time and processing resources. Additional application server memory is required to copy the data into a result table to perform the sorting.

In some implementations, the data processing application 114 generates the processed file 118 from information in the database tables 116 after the processing of the information in the database tables (e.g., after step 212). For example, the data processing application can perform queries (e.g., Join or Sort queries) of tables in the database and copy the responsive information to the processed file 118. The processed file 118 can grow in size following each database operation requested by the data processing application 114.

In step 214, the application program clears the one or more database tables 116 by deleting all the records in the table or writing over the records in the table. The application program then unlocks the database table (step 216) to free the table for use by other processes. In some examples, the database table is deleted, either after the clearing or unlocking, or in lieu of the unlocking and/or cleaning.

Process 200 can provide an efficient method for handling large amounts of data from the data extract file 106. Less efficient methods include reading the information from the data extract file 106 into internal tables in application server memory 304 (e.g., internal tables defined by the data processing application 108 using the Advanced Business Application Programming language). Access to the internal tables is quick, but the internal tables do not provide data processing application 108 the breadth of operations that are provided by a database system. In other words, the memory accessing techniques are not as robust as the database accessing techniques.

When application server memory is used to store file contents for processing, the data processing application is limited in the size of the data extract file 106 that it can operate upon. As an illustration, the data extract file 106 may be five gigabytes and the application server memory 304 only one gigabyte. The inability to store the entire file in the application server memory 304 leads to either memory overflow, the use of virtual memory, or inefficient recursive calls for portions of the data extract file 106 from the peripheral memory storage 322. During the recursive calls, data portions are processed, and upon requiring data that is not in application server memory 304, additional portions of the data extract file 106 needs to be brought into application server memory 304 and overwrite existing data. Because the data extract file 106 is not structured like the database or internal tables, accessing information from the file is inefficient.

In another illustration, an ability to add additional application server memory 304 is limited. For example, a 32-bit operating system only permits addressing four gigabytes of data. Virtual memory does not provide an adequate solution because it can be very slow (requiring the loading of page tables similar to the recursive calls previously described) and is constrained by the addressable memory space of an operating system. If a data extract file is 217 gigabytes, virtual memory on a 32-bit system is not capable of providing access to contents of the entire file, and recursive calls to the data extract file is too inefficient.

The system described in the present disclosure does not have the same size constraints as the application server memory or the use of virtual memory. In addition, the system described in the present disclosure can provide access to information more quickly than virtual memory. With a 64-bit operating system, the addressable memory space for the application server memory is larger than a 32-bit system, but the cost of sufficient application server memory to handle large data extract files 106 can be prohibitively expensive.

The system described in the present disclosure enables a data processing application to realize the various benefits of processing data using database accessing techniques instead of application server memory accessing techniques. The database tables are generated by the data processing application subsequent to the execution of the data processing application and are removed prior to the termination of the application program. The database tables, in this respect, are similar to the use of tables in application server memory. The use of a database, however, enables the efficient processing storing of significantly more data and the use of more robust accessing techniques.

In some implementations, the application generator 114 identifies a size of the data extract file 106 or portions of the data extract file that are selected for processing. If the application generator 114 determines that the size of the data extract file or the portions thereof exceed a size of application server memory 304, a data processing application 108 can be generated that copies the portions of information from the data extract file 106 into the database table 116, as described above. If the application generator 114 determines that the size does not exceed the size of the application server memory 304, a data processing application 108 can be generated that reads the portions of information from the data extract file 106 into local tables in application program memory.

Processing data in the application program memory local tables can be faster than processing the data in database tables. This determination by the application generator can generate a data processing application 108 that processes the data extract file 106 in the most efficient method. In some examples, the data processing application determines that the size of the file or the portions thereof exceeds a size of application server memory that is allocated for use by the data processing application, or addressable memory space available to the data processing application 108.

In some implementations, an interface receives instructions from the data processing application 108 that are intended for processing data in application server memory local tables. The interface can modify the instructions and transmit them to database tables. For example, the data processing application 108 can read a portion of information from the data extract file 106 and transmits to the interface a request that the portion of information be stored within local tables stored in application server memory. The interface can modify the request and transmit the request to a DBMS. The interface can similarly intercept instructions to process data in application server memory local tables. The use of an interface enables the features discussed in this document to be implemented on an application program without modification of the application program source code.

In some implementations, a separate application program receives the portions of information from the data extract file 106 and stores the portions of information in the database table generated by either the data processing application 108 or the DBMS. This separate application program can be generated by application generator 114 and can signal the data processing application upon copying all the information from the data extract file 106 to the database tables 116. Information from the data extract file may never pass through the portion of application server memory 304 allocated to the data processing application 108.

In some implementations, the data processing application and the application generator 114 are portions of the same application program. The data processing application 108 can represent a portion of the application program that reads the data extract file 106 and processes information from the data extract file, while the application generator 114 can represent a portion of the application program that interfaces with a user to identify the operations that should be performed by the data processing application 108. The data processing application program need not be a separate executable file.

In some implementations, the data extract file 106 is a flat file. The data extract file can contain data that does not have any structured relationships. For example, the file can be a comma-delimited ASCII file. The data extract file 106 can be a comma-separated value (CSV) file. Fields coped to the data extract file 106 may not include links to other fields copied to the data extract file 106. The structure of the data extract file 106 may only be addressable from data processing applications 108.

In some implementations, the primary memory storage includes a CPU 306 cache and application server memory 304. The application server memory 304 can be RAM or other electronic memory storage that the CPU can access via system bus 310 and execute instructions from in synchrony with the system bus 3 10. The application server memory 304 can store running processes. For example, application generator 108, data processing application 114, and DBMS 308 can run or be executed from the application server memory 304. In some examples, the application server memory 304 is only accessible to the one CPU 306. No other CPUs can access the application server memory 304. The primary memory storage 302 can be volatile, electronic memory storage. For example, the CPU cache and application server memory 304 can lose stored information when power to the components is disrupted.

In some implementations, the peripheral memory storage is persistent, non-volatile memory storage 322. If power is disrupted to the peripheral memory storage 322, information stored by the peripheral memory storage is not lost. For example, the data extract file 106, the processed file 118, and the database tables 116 are capable of being stored in memory 322 without a power source. The peripheral memory storage can be magnetic storage, for example a disk drive. In various examples, information from the peripheral memory is transferred to the primary memory storage over an external data bus 318 (e.g., using IDS, SATA, ATA, or SAS interfaces). In some examples, the data extract file 106, the processed file 118, and the database tables 116 are stored in different peripheral memory storages 322.

Figure 4:
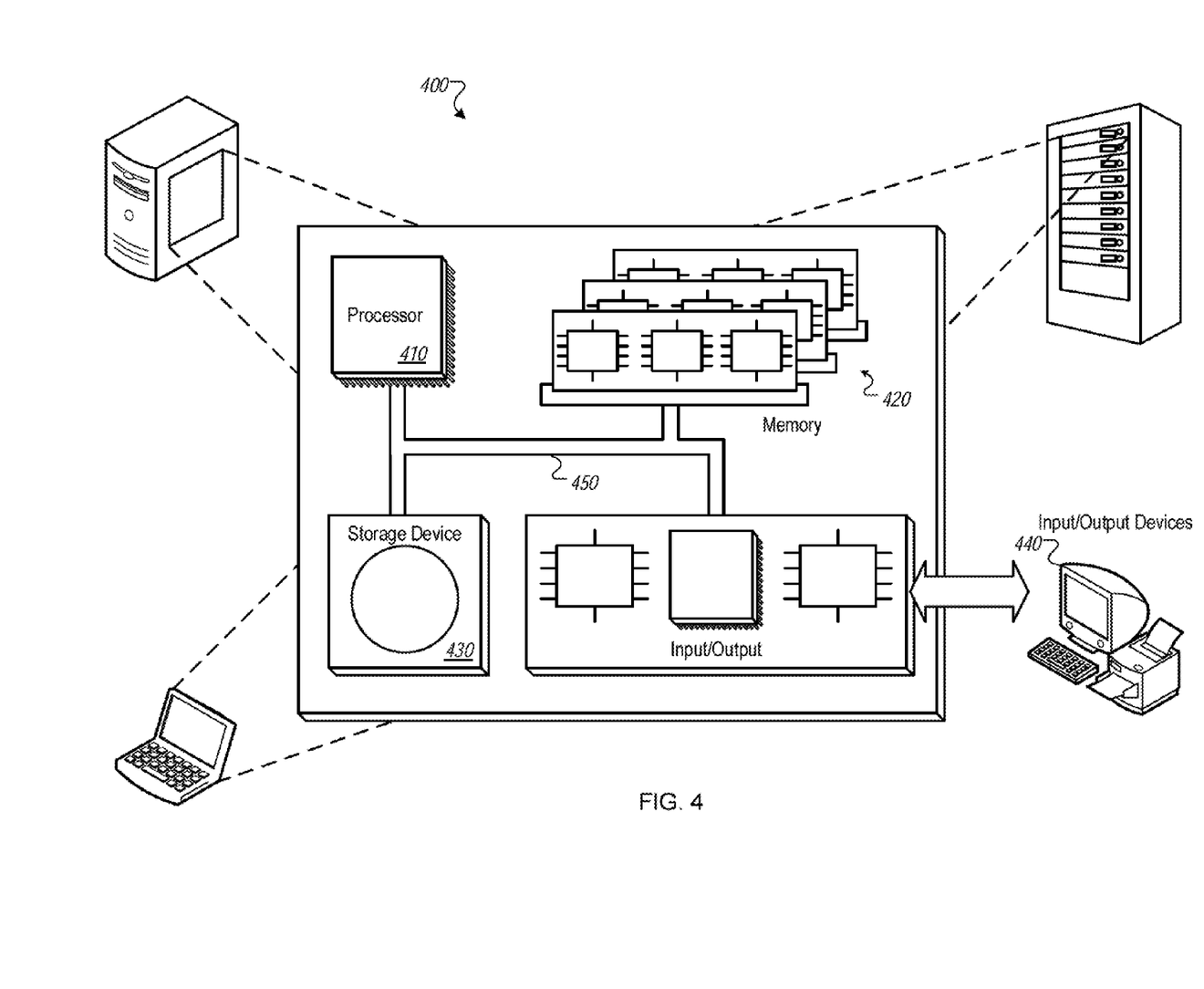
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for handling large amounts of data, the method comprising:

receiving, using an application program executed from local memory of a computer system, portions of information from a first file;

generating a database table in a peripheral storage device;

storing the portions of information in the database table of the peripheral storage device in lieu of storing the information in the local memory of the computer system, wherein the database table and local memory are both accessible to the application program;

locking the database table, wherein the locking exclusively provides the application program a database accessing technique to the database table;

processing by the application program the portions of information in the database table using the database accessing technique;

clearing the database table upon a termination of the application program; and unlocking the database table upon the termination of the application program.

2. The computer-implemented method of claim 1, wherein the processing includes generating a second file that includes portions of the processed information.

3. The computer-implemented method of claim 1, wherein the received portions of the first file exceed an addressable memory space of the local memory.

4. The computer-implemented method of claim 1, further comprising determining that the portions of information from the first file exceed an addressable memory space of the local memory and, in response, receiving the portions of information, generating the database table, and storing the portions of information.

5. The computer-implemented method of claim 1, wherein the database accessing technique exclusively provided to the application program includes write access to the database table.

6. The computer-implemented method of claim 1, further comprising deleting the database table upon termination of the application program.

7. The computer-implemented method of claim 1, wherein the local memory is volatile memory that loses a capability to store information upon a power disruption and the peripheral storage device is non-volatile memory that stores information magnetically and maintains a capability to store information upon a power disruption.

8. A computer program product tangibly embodied in a computer-readable storage medium and comprising instructions that when executed by a processor perform a method for handling large amounts of data, the method comprising:

receiving, using an application program executed from local memory of a computer system, portions of information from a first file;

generating a database table in a peripheral storage device;

storing the portions of information in the database table of the peripheral storage device in lieu of storing the information in the local memory of the computer system, wherein the database table and local memory are both accessible to an application program;

locking the database table, wherein the locking exclusively provides the application program a database accessing technique to the database table;

processing by the application program the portions of information in the database table using the database accessing technique;

clearing the database table upon a termination of the application program; and unlocking the database table upon the termination of the application program.

9. The computer program product of claim 8, wherein the processing includes generating a second file that includes portions of the processed information.

10. The computer program product of claim 8, wherein the received portions of the first file exceed an addressable memory space of the local memory.

11. The computer program product of claim 8, wherein the method further comprises determining that the portions of information from the first file exceed an addressable memory space of the local memory and, in response, receiving the portions of information, generating the database table, and storing the portions of information.

12. The computer program product of claim 8, wherein the database accessing technique exclusively provided to the application program includes write access to the database table.

13. The computer program product of claim 8, wherein the method further comprises deleting the database table upon termination of the application program.

14. The computer program product of claim 8, wherein the local memory is volatile memory that loses a capability to store information upon a power disruption and the peripheral storage device is non-volatile memory that stores information magnetically and maintains a capability to store information upon a power disruption.

15. A system for handling large amounts of data, the system comprising:

a processor;

local memory coupled to the processor through a memory bus;

a peripheral storage device; and a computer-readable storage medium comprising instructions that when executed by the processor perform a method for handling large amounts of data, the method comprising:

receiving, using an application program executed from the local memory of a computer system, portions of information from a first file;

generating a database table in the peripheral storage device;

storing the portions of information in the database table of the peripheral storage device in lieu of storing the information in the local memory of the computer system, wherein the database table and local memory are both accessible to an application program;

locking the database table, wherein the locking exclusively provides the application program a database accessing technique to the database table;

processing by the application program the portions of information in the database using the database accessing technique;

clearing the database table upon a termination of the application program; and unlocking the database table upon the termination of the application program.

* * * * *